United States Patent [19]
Weder et al.

[11] Patent Number: 5,391,208
[45] Date of Patent: Feb. 21, 1995

[54] METHOD AND APPARATUS FOR STEMMING FLOWERS

[75] Inventors: Donald E. Weder; Joseph G. Straeter, both of Highland, Ill.

[73] Assignee: Highland Supply Corporation, Highland, Ill.

[21] Appl. No.: 949,411

[22] Filed: Sep. 22, 1992

[51] Int. Cl.6 .............................. A01G 7/00
[52] U.S. Cl. .................... 47/1.01; 89/564.8; 47/55
[58] Field of Search .......... 47/55, 1 B, 1.01; 29/564.6, 564.8

[56] References Cited

U.S. PATENT DOCUMENTS

| | | | |
|---|---|---|---|
| 4,282,644 | 8/1981 | Petree | 29/564.8 |
| 4,348,832 | 9/1982 | Hauser . | |
| 4,667,397 | 5/1987 | Day et al. | 29/564.6 |
| 4,928,424 | 5/1990 | Campanelli et al. . | |
| 5,020,209 | 6/1991 | Fullard | 29/564.8 |
| 5,174,794 | 12/1992 | Brownlee et al. . | |

FOREIGN PATENT DOCUMENTS

| | | | |
|---|---|---|---|
| 759897 | 11/1932 | France | 47/55 |
| 937617 | 12/1946 | France | 47/55 |
| 2436556 | 5/1980 | France | 47/55 |

*Primary Examiner*—Michael Powell Buiz
*Assistant Examiner*—Joanne C. Downs
*Attorney, Agent, or Firm*—Dunlap & Codding

[57] ABSTRACT

A method and apparatus for stemming a flower in which the flower stem is cut substantially simultaneously with attaching a flower pick to the flower stem, thereby eliminating the separate steps of cutting the flower stem and subsequently attaching a stem pick by combining these two operations. In another aspect of the invention, the flower stem is cut in an environment which displaces air from the region of the severed plant stem by submerging the portion of the plant stem in the region of severance underwater or by subjecting it to a flow of water or a spray of water or other material which would prevent formation of an air gap in the vascular tissue of the plant and/or skinning over of the tubules. The water or other material used for displacing air in the region of severance may contain a floral preservative or nutrient or bacteria stat or other material to help prolong the shelf life of the flower.

10 Claims, 3 Drawing Sheets

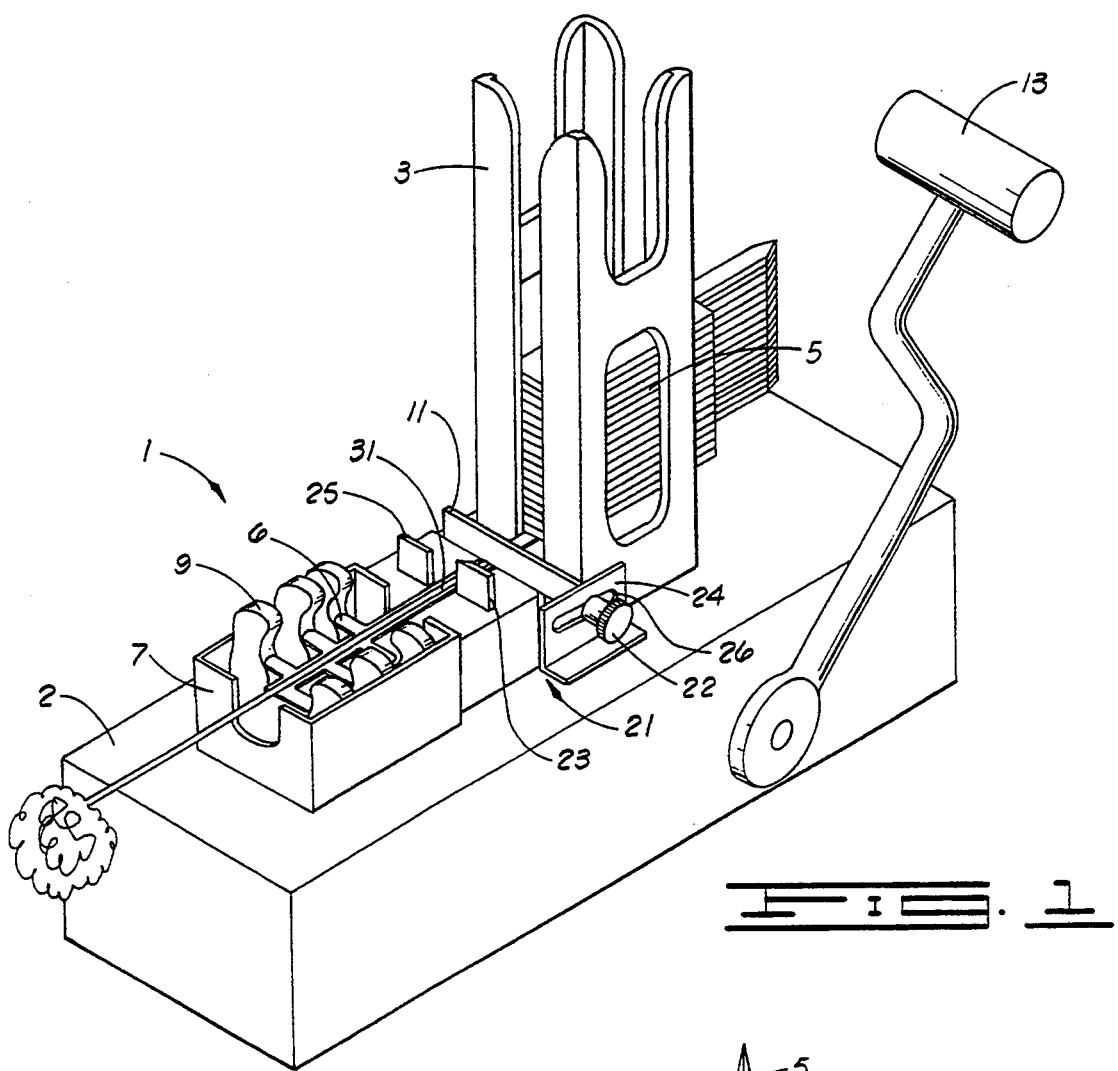
FIG. 1
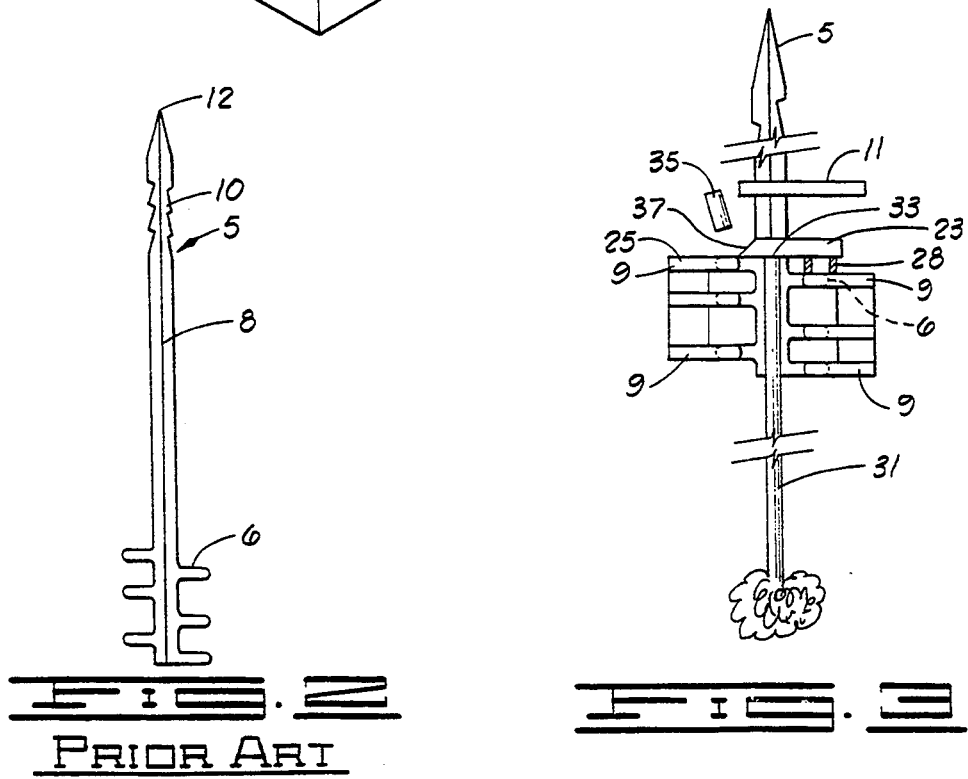
FIG. 2
PRIOR ART
FIG. 3

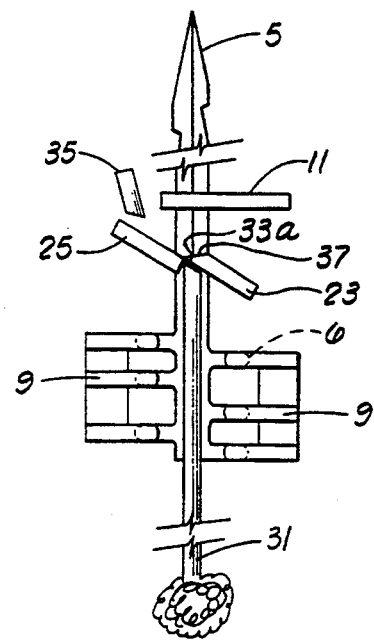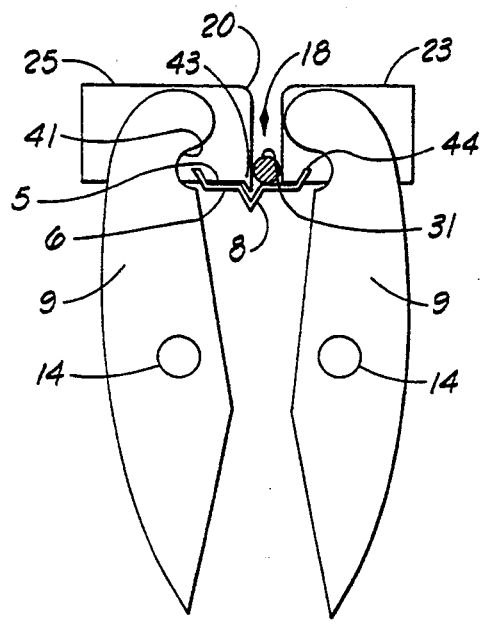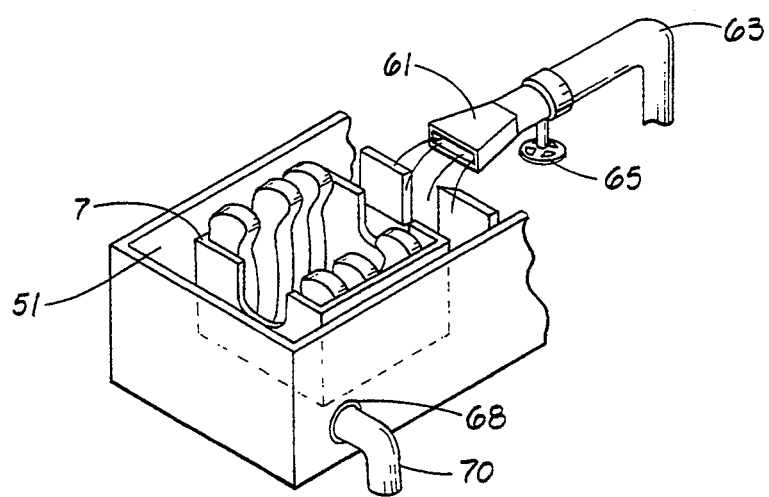

METHOD AND APPARATUS FOR STEMMING FLOWERS

BACKGROUND OF THE INVENTION

1. Field Of the Invention

This invention relates to the field of preparing floral arrangements, and in particular to preparing individual flowers for such floral arrangements by inserting on the stem of a flower a stem pick. The invention also relates to the field of cutting flower stems, and more particularly to cutting flower stems in an airless environment. Finally, the invention relates to methods and apparatuses combining these concepts in various ways.

2. Brief Description of the Prior Art

Floral stem picks have been in use for many years for the purposes of strengthening and supporting the stems of individual botanical items, such as flowers, so that they can be easily handled and placed in position, for example in floral foam, without crushing the stems of the flowers. Such prior art stem picks may be made of steel and may have a number of fingers which wrap around and grasp the stem of the flower. In this manner, the stem pick acts as a rigid prolongation of the flower stem.

Prior to application of the stem pick to the flower stem, it is usually necessary to cut the stem of the flower to a length such that the finished combination of flower, flower stem and stem pick is of the proper length for the floral arrangement. In the past, the cutting of the flower stem to an appropriate length has been done manually or with an automatic cutter as a separate step in the preparation of the flower prior to attachment of the stem pick.

Processing flowers by cutting underwater is becoming popular by wholesalers and florists. Many wholesalers are cutting all of their flowers underwater, particularly roses, imports, and more expensive flowers. The benefit in cutting flower stems underwater is that it prevents the formation of an air gap or air bubbles in the vascular tissue of the plant, thereby interrupting the transpiration stream of water within the xylem. This procedure also avoids the skinning effect, i.e., it prevents sealing of the tubules of the stem with sap that oozes from the end of the flower stem after the stem is cut. The water thus, in addition to displacing air from the raw cut flower stem, prevents or retards skinning over the tubules which occurs in the natural healing process for the damaged (cut) plant.

In spite of the benefits of underwater cutting, many wholesalers and florists, especially during the holiday seasons, find that the time constraints and the volume of flowers necessary to process makes it impractical to cut all of the flowers under water. In such a case, the lesser quality flowers are cut without submergence in water. Additionally, a water source may not be handy or the extra time taken to manipulate the flower stems to both cut the stem underwater and, in a subsequent step, attach a stem pick, simply requires too much time and is not cost effective.

Pick stemming machines have been developed and manufactured in both a table top model and a portable model in which a stack of stem picks is inserted in the machine, and by moving a handle, an operator can cause the stem pick to attach to the flower stem, and the assembled flower and stem pick arrangement is then manually removed from the machine. Such machines have been made by B & K Tool, Die and Stamping Co., Inc. located in Ridgewood, New York. While such machines are effective to attach a stem pick to a flower stem, the problems of interrupting the transpiration stream in the flower stem and skinning over of the tubules are not solved, and the life of the floral arrangement containing flowers with picks applied by the machines of the prior art is foreshortened.

SUMMARY OF THE INVENTION

In the following description, the term "botanical item" is used to mean a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping. For convenience only, the term "flower" will be used generically as a substitute for the term "botanical item" such that when the term "flower" is used, what is meant is the term "botanical item".

As used herein the term "growing medium" means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth. Such life enhancing additives are readily available and are made and sold under various trade names.

The term "water bath" as used herein, includes, but is not limited to, containers or chambers of water, a flower or stream of water, steam, water spray, or water mist.

The phrase "substantially simultaneous" as used herein to describe the temporal relationship between severing a flower stem and attaching a stem pick to the flower stem, is to be understood to include: severing the flower stem prior to the initiation of or the completion of the attachment of a stem pick to the flower stem; attaching a stem pick to the flower stem prior to the initiation of or the completion of the severing of the flower stem; and initiating or completing the severing of the flower stem at the same time as initiating or completing the attaching of a stem pick to the flower stem.

The present invention overcomes the disadvantages associated with prior art methods and apparatuses as discussed above by providing a method and apparatus for stemming a flower in which the flower stem is cut substantially simultaneously with attaching a floral pick to the flower stem. This eliminates the separate steps of cutting the flower stem and subsequently attaching a stem pick, by combining these two operations essentially into one operation.

In another aspect of the invention, the flower stem is cut in an environment which displaces air from the region of the severed plant stem by submerging the portion of the plant stem in the region of severance underwater or by subjecting it to a flow of water or a spray of water or other growing medium which would prevent formation of an air gap in the vascular tissue of the plant and/or skinning over of the tubules. If desired, the water or growing medium used for displacing air in the region of severance may contain a floral preservative or nutrient or bacteria stat or other material to help prolong the shelf life of the flower.

Other features of the invention will be become evident by reference to the following description having reference to the accompanying drawings.

BRIEF DESCRIPTION OF THE DRAWINGS

FIG. 1 is a perspective view of a floral steaming machine incorporating the pick attachment assembly and stem cutting combination according to the present invention;

FIG. 2 shows a prior art steel stem pick;

FIG. 3 is a schematic partial plan view of the pick attachment assembly and the flower stem cutting arrangement, with the cutting knife operating to cut the flower stem perpendicular to its axis;

FIG. 4 is a schematic partial plan view of the pick attachment assembly and the flower stem cutting arrangement, with the cutting knife operating to cut the flower stem at an angle with respect to the axis of the flower stem;

FIG. 5 is a partial front view of the stemming machine of FIG. 1 showing an arrangement of the stem pick attachment jaws and cutting knife assembly with the flower stem offset from the axis of the stem pick;

FIG. 6 illustrates a flower with its stem cut off and with a stem pick attached to the extremity of the flower stem;

FIG. 9 shows the cutting region of a stemming machine being doused by a water spray issuing from a nozzle;

DETAILED DESCRIPTION OF THE PREFERRED EMBODIMENTS

Figure 7:
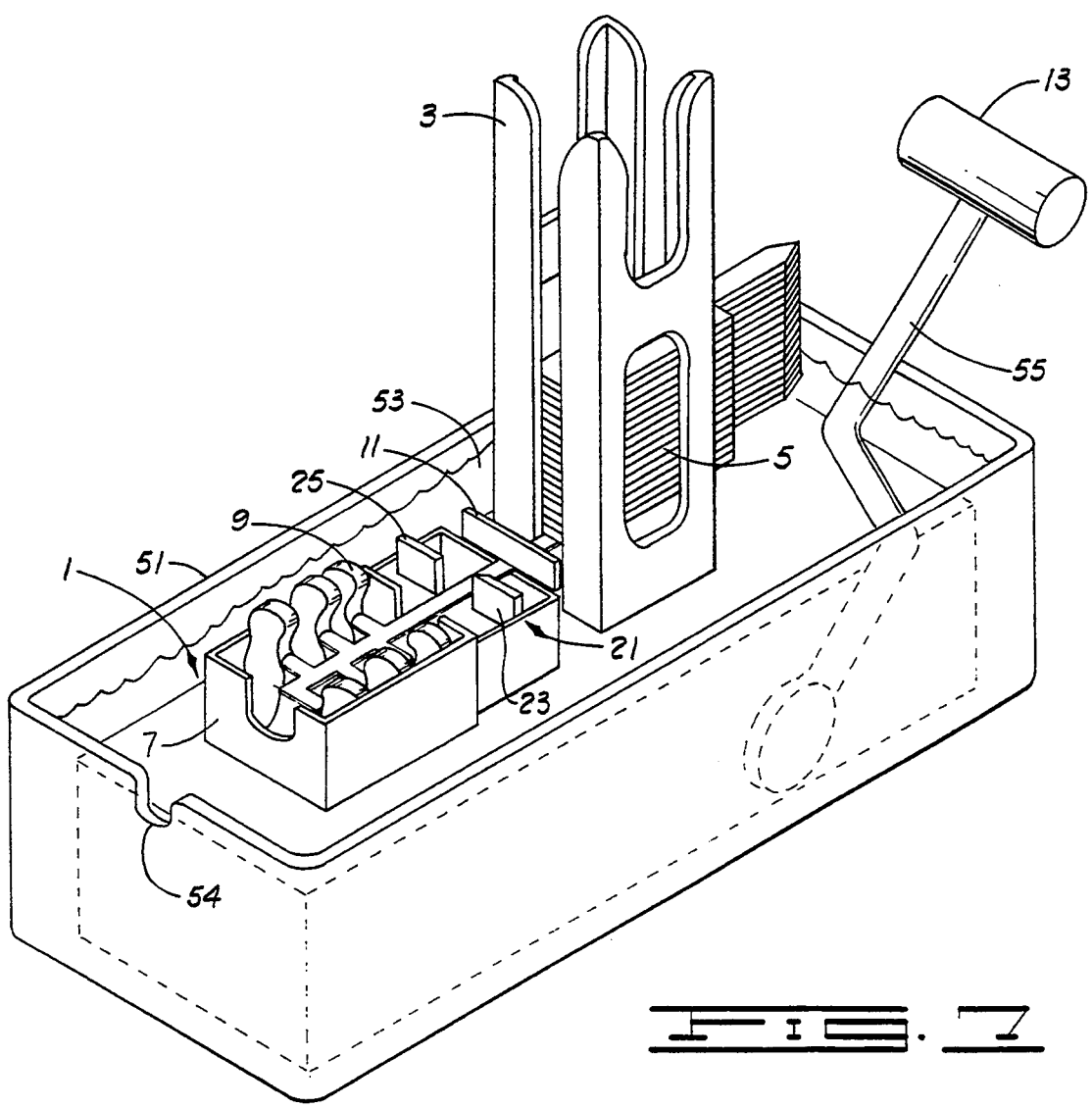
FIG. 7 is a perspective view of a stemming machine, similar to that of FIG. 1, showing the embodiment of the invention wherein the flower stem cutting and stem pick attachment procedures are conducted under water.

Referring to FIG. 1, a flower stemming machine is illustrated, and all illustrated parts of the machine in FIG. 1 are known from the prior art with the exception of the addition of a cutter assembly, and the addition of an adjustable stem stop.

Stemming machine 1 includes a base 2 upon which is mounted a stem pick stacker 3 carrying a number of stem picks 5, a stem pick attachment assembly 7, a cutting assembly 21, and an adjustable stem stop 11. One stem pick 5 is shown in a position ready for attachment to the extremity of a flower stem, the stem pick 5 having a plurality of fingers 6 extending horizontally within the attachment assembly 7 and between movable jaws 9. A flower stem precut or selected to a length approximately ⅛ inch to ½ inch longer than its length after cutting, is inserted in the attachment assembly 7 between jaws 9 and moved forward such that the face end of the flower stem abuts the front face of adjustable stem stop 11.

While the flower stem is in the position ready to receive an attached stem pick, handle 13 is moved in a downward direction which draws jaws 9 on each side of attachment assembly 7 toward one another. At the same time, knife 23 and backup knife 25 move toward one another to sever the flower stem 31 by the scissors action between the plane surfaces of knife 23 and backup knife 25, thereby effecting a shear action to sever the end of the flower stem from the rest of the flower. Desirably, cutting assembly 21 can be attached to the end jaws 9 in attachment assembly 7, so that the cutting of the flower stem occurs simultaneously with the bringing together of jaws 9 to crimp the fingers 6 of stem pick 5 without substantial redesign of the stemming machine mechanism.

In order to accommodate stems of different lengths, stem stop 11 is made adjustable by means of a thumb screw 22 fitting through a slot 26 in adjustment bar 24. The end of stop 11 opposite that of thumb screw 22 can be a free end or may have a downward protrusion extending into a slot (not shown) in base 2 or other known means for giving stability to the end of stop 11 opposite thumb screw 22. To adjust the length of the cutoff portion of the flower stem, thumb screw 22 is loosened, stop 11 is slid left or right (in FIG. 1) to the desired position, and then thumb screw 22 is screwed tight to lock stop 11 in place.

FIG. 2 shows the outline of a prior art thin steel stem pick 5 having fingers 6, a V-groove channel 8 (better seen in FIG. 5), barbs or spikes 10, and a pointed tip 12.

FIG. 3 shows a schematic plan view of part of the stemming machine of FIG. 1 with a stem pick 5 in position between jaws 9 and partially bent in a direction to eventually embrace the stem 31 of a flower. The fingers 6 are shown to be partially curled (out of the paper in FIG. 3) by the action of the curved surfaces of jaws 9 but not yet clamped or cinched about the flower stem 31. At this point in the process of attaching the stem pick 5, knife 23 has already severed the end of flower stem 31, and the cutoff portion 35 of stem 31 is discharged from the machine.

As illustrated, movable knife 23 is fixed to the upper right jaw 9 by means of screws 28 or other fastening means, and the opposing jaw 9 is machined to have a cutting surface cooperating with knife blade 23 such that the upper left jaw 9 in FIG. 3 functions as the backup knife 25. It will be understood that both knife 23 and backup knife 25 can be operated by a mechanism not directly connected to jaws 9, or an additional pair of specially designed jaws 9 can be attached to the attachment assembly 7 and act as the knife and backup knife. Finally, instead of using the upper left jaw 9 as backup knife 25, a separate, removable, backup knife 25 can be attached to upper jaw 9 by screws or other fasteners. Removability permits ease of sharpening and replacement of the knife parts.

In FIG. 3, the knife 23 and backup knife 25 are shown attached to the upper right and upper left jaws 9 so as to reciprocate along a path perpendicular to the axes of stem pick 5 and flower stem 31.

In FIG. 4, the same cutting action as that described in connection with FIG. 3 is shown to take place by the cutter knife 23 and backup knife 25, with the exception that the knife components are aligned so that the cutting action is at an angle with respect to the axes of the stem pick 5 and flower stem 31. In this embodiment of the invention, the knife components 23 and 25 cannot be attached to the jaws 9 for obvious reasons. Cutting the flower stem 31 at an angle has the benefit of creating a greater cross-sectional area of the cut stem thereby enhancing the transpiration of water and/or nutrients through the xylem of the flower stem.

In FIG. 5, a pair of opposing jaws 9 are shown to be pivotable about corresponding pins 14, and the jaws, as shown, are in their fully open position. In this position, and noting that knife 23 and backup knife 25 are mechanically connected to the tops of opposing jaws 9, a gap 18 is defined within which the flower stem 31 is inserted and comes to rest on the top of stem pick 5. The top corners of knife parts 23, 25 are beveled so as to assist the operator in easily locating flower stem 31 in gap 18.

Normally, the flower stem 31 would fall naturally in the center of stem pick 5 and lie in the V-groove 8. However, as can be appreciated by observing the limitations on space that the knife parts 23, 25 have for shearing the stem 31, if the stem 31 was fully seated in groove 8, the knives would only shear the top, although major, portion of stem 31 and perhaps leave some strands of connected fiber such that the cut end of flower stem 31 would not be completely severed. To solve this problem, knife block 25 is shown offset over the center of V-groove 8, and this limits the location of flower stem 31 forcing it to ride on the raised portion of stem pick 5 such that the blades 23, 25 can fully sever the stem.

As a further aid to insure that no fragment of the flower stem 31 is trapped between the bottoms of the sliding knife parts 23, 25 and the V-groove 8, a protuberance 43 is formed at the bottom of the backup knife 25 and extends a distance into V-groove 8.

The knife parts 23 and 25 are shown in FIG. 5 to extend below the tops of finger tips 44, which is possible because there are no fingers 6 at the cutting location.

In operation, as the jaws 9 are drawn toward one another, the finger tips 44 are cammed upwardly by the curved surfaces 41 of jaws 9 at about the same time that the knife 23 engages the flower stem 31. Accordingly, by the time the fingers 6 are formed about the flower stem 31, knife 23 has already severed the stem 31, and the cut free end of flower stem 31 is then free to move laterally and seek a centered position in V-groove 8, i.e. vertically axially aligned with the axis of the stem pick 5. Thus, the offset axes of flower stem 31 and stem pick 5 as shown in FIG. 5 is a temporary situation, since jaws 9 are symmetrically arranged about the ultimate common axis of the pick 5 and flower stem 31 and force the desired alignment upon completion of the step of attaching the pick.

FIG. 6 shows a stem pick 5 attached to the extremity of flower stem 31 with fingers 6 wrapped thereabout and a fresh cut end 33 of stem 31.

FIG. 7 illustrates a simplistic way of cutting the flower stem underwater. In this case, the entire assembly of FIG. 1 is disposed within a container 51 filled with water 53 to a level to exceed the level of cutting of the stem 31 of the flower. A notch 54 in container 51 is provided for relatively unrestricted insertion of the flower stem into attachment assembly 7, although the level of water 53 would be close to the bottom of notch 54. In this embodiment, an operating lever 55 is bent so as to be fully operable by the operator without interference from the sides of the container 51.

All parts of the machine shown in FIG. 7 should be made of stainless steel, plastic, or other components that are not susceptible to rust or corrosion by the water bath environment. The embodiment of FIG. 7 is shown for the sake of simplicity in setting forth this particular feature of the invention, and it will be understood that various forms of this embodiment would be within the spirit and scope of the invention. That is, a small container (not shown) can hold the cutter assembly 21, or the attachment assembly 7 and cutter assembly 21 combination, separate from the other parts of the stemming machine, taking into consideration water seals, an entrance notch for the flower stem 31, and like considerations.

Figure 8:
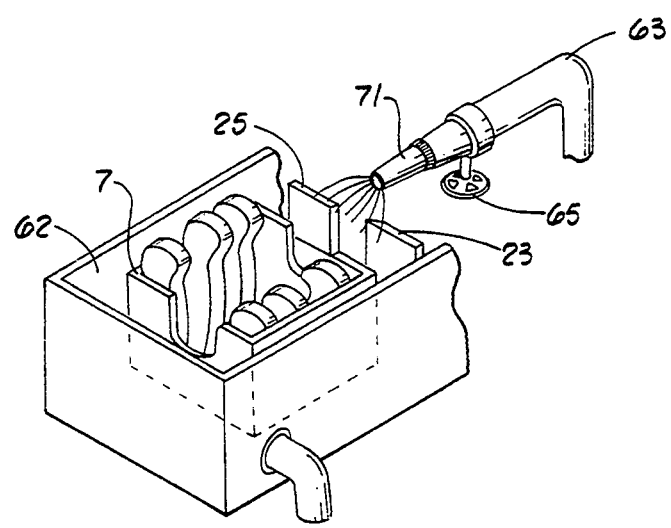
FIG. 8 shows the cutting region of a stemming machine being doused by a flow of fluid from a nozzle.

FIG. 8 is an alternate embodiment of the arrangement of FIG. 7 in which, rather than filling container 51 completely full of water above the level of the cutter knives 23, 25, a stream or flow of water is provided by a nozzle 61 fed by a water line 63, and the assembly is fixed to body 2 by any convenient mounting means 65. In this embodiment, a drain 68 with an attached run-off tube 70 carries the water to a filter and recycling pump, if desired for minimizing the environmental impact. In this embodiment, container 51 is simply a collector vessel and may be quite shallow.

FIG. 9 is similar to that of FIG. 8 with the exception that, rather than a flow nozzle 61 as in FIG. 8, a spray nozzle 71 is provided to create a highly saturated water environment for the end of the flower stem being cut.

As discussed earlier in this description, instead of water, other materials could be used for displacing the air about the end of the flower stem being cut, including materials or additives that incorporate a floral preservative, nutrient, or bacteria stat, or any other growing medium.

It will be apparent to those skilled in the art that changes may be made in the construction and in the operation of the various components, elements and assemblies described herein, or in the steps or the sequence of steps of the methods described herein, without departing from the spirit and scope of the invention. For example, the timing of the cutting relative to the attachment of the stem pick is not critical. The stem can be cut before, during, or after attachment of the stem pick to the flower stem. The arrangement described herein is merely one example of a preferred embodiment of the invention in these respects. Accordingly, the invention is to be interpreted only as to the scope of the appended claims.

What is claimed is:

1. An apparatus for stemming a flower for use with a stem pick adapted to be attached to the stem of a flower to be stemmed, the stem pick including attachment means for attaching the stem pick to the flower stem and a piercing prolongation extending from the attachment means, said apparatus comprising;

means for attaching the stem pick to the flower stem by effecting engagement of the stem pick attachment means with the flower stem;

means for cutting through the stem of the flower to sever the flower stem at a location on the flower stem between the region of attachment of the stem pick and the piercing prolongation of the stem pick; and means for displacing air in the region of severance of the flower stem, which air would otherwise be drawn into the vascular tissue of the flower stem after severance.

2. The apparatus as claimed in claim 1, wherein said means for displacing air comprises a water chamber for submerging said region of severance.

3. The apparatus as claimed in claim 1, wherein said means for displacing air comprises means for creating a flow of water pouring over said region of severance.

4. The apparatus as claimed in claim 1, wherein said means for displacing air comprises means for creating a water spray engulfing said region of severance.

5. The apparatus as claimed in claim 1, wherein said means for cutting includes:

a knife; and means for moving said knife through the flower stem along a path perpendicular to the axis of the flower stem.

6. The apparatus as claimed in claim 1, wherein said means for cutting includes:
   a knife; and
   means for moving said knife through the flower stem along a path angularly oriented with respect to the axis of the flower stem.

7. The apparatus as claimed in claim 1, wherein said means for attaching attaches the stem pick to the flower stem before said means for cutting severs the flower stem.

8. The apparatus as claimed in claim 1, wherein said means for cutting severs the flower stem before said means for attaching attaches the stem pick to the flower stem.

9. An apparatus for stemming a flower for use with a stem pick adapted to be attached to the stem of a flower to be stemmed, the stem pick including attachment means for attaching the stem pick to the flower stem and a piercing prolongation extending from the attachment means, said apparatus comprising;
   means for attaching the stem pick to the flower stem by effecting engagement of the stem pick attachment means with the flower stem;
   means for cutting through the stem of the flower to sever the flower stem at a location on the flower stem between the region of attachment of the stem pick and the piercing prolongation of the stem pick; and
   means for guiding the flower stem out of axial registration with the stem pick before the flower stem is cut, and wherein said means for attaching is operative, after operation of said means for cutting, to urge the flower stem into axial registration with said stem pick.

10. An apparatus for stemming a flower for use with a stem pick adapted to be attached to the stem of a flower to be stemmed, the stem pick including attachment means for attaching the stem pick to the flower stem and a piercing prolongation extending from the attachment means, said apparatus comprising;
    means for attaching the stem pick to the flower stem by effecting engagement of the stem pick attachment means with the flower stem;
    means for cutting through the stem of the flower to sever the flower stem at a location on the flower stem between the region of attachment of the stem pick and the piercing prolongation of the stem pick; and
    wherein said means for attaching attaches the stem pick to the flower stem about simultaneously with the cutting of the flower stem by said means for cutting.

* * * * *